United States Patent
Egawa

(10) Patent No.: US 8,436,927 B2
(45) Date of Patent: May 7, 2013

(54) SOLID-STATE IMAGING DEVICE

(75) Inventor: Yoshitaka Egawa, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 13/226,818

(22) Filed: Sep. 7, 2011

(65) Prior Publication Data

US 2012/0062776 A1 Mar. 15, 2012

(30) Foreign Application Priority Data

Sep. 10, 2010 (JP) ................................. 2010-203635

(51) Int. Cl.
- H04N 3/14 (2006.01)
- H01L 27/00 (2006.01)
- H01L 31/062 (2006.01)

(52) U.S. Cl.
USPC .......... 348/308; 348/312; 348/313; 348/297; 348/302; 250/208.1; 257/291; 257/292

(58) Field of Classification Search .......... 348/297–301, 348/302–324, 241, 243; 250/208.1, 214.1, 250/214 R, 214; 257/444, 291, 292
See application file for complete search history.

(56) References Cited

U.S. PATENT DOCUMENTS

| | | | |
|---|---|---|---|
| 6,801,256 B1 | 10/2004 | Egawa et al. | |
| 6,867,804 B1* | 3/2005 | Kim et al. | 348/294 |
| 6,897,429 B1* | 5/2005 | Turner et al. | 250/214 R |
| 7,362,366 B2 | 4/2008 | Egawa et al. | |
| 7,659,500 B2* | 2/2010 | Purcell | 250/208.1 |
| 2004/0080646 A1* | 4/2004 | Zhao et al. | 348/302 |
| 2008/0143860 A1* | 6/2008 | Sato | 348/301 |
| 2008/0252356 A1* | 10/2008 | Oike | 327/374 |
| 2012/0062776 A1* | 3/2012 | Egawa | 348/302 |

FOREIGN PATENT DOCUMENTS

| | | |
|---|---|---|
| JP | 9-247538 | 9/1997 |
| JP | 2005-311932 | 11/2005 |
| JP | 2006-253903 | 9/2006 |
| JP | 2008-22259 | 1/2008 |

OTHER PUBLICATIONS

Seunghyun Lim, et al., "A High-Speed CMOS Image Sensor With Column-Parallel Two-Step Single-Slope ADCs", IEEE Transactions on Electron Devices, vol. 56, No. 3, Mar. 2009, pp. 393-398.

Yoshikazu Nitta, et al., "High-Speed Digital Double Sampling with Analog CDS on Column Parallel ADC Architecture for Low-Noise Active Pixel Sensor", ISSCC 2006, (International Solid-State Circuits Conference), Session 27, Image Sensors, 27.5, Feb. 8, 2006, pp. 500, 501.

U.S. Appl. No. 13/353,658, filed Jan. 19, 2012, Egawa.

Office Action issued on Jan. 8, 2013 in Japanese Patent Application No. 2010-203635, filed Sep. 10, 2010 (with English language translation).

* cited by examiner

Primary Examiner — Nhan T Tran
Assistant Examiner — Marly Camargo
(74) Attorney, Agent, or Firm — Oblon, Spivak, McClelland, Maier & Neustadt, L.L.P.

(57) ABSTRACT

According to one embodiment, in a pixel array unit, pixels that accumulate photoelectrically converted charges are arranged in a matrix shape. A vertical signal line transmits a signal read out from the pixels in the vertical direction. An acceleration circuit shifts the potential of the vertical signal line in advance before a signal is read out from the pixels. The acceleration control circuit controls timing for shifting the potential of the vertical signal line in advance. The timing control circuit generates a control signal for controlling the acceleration control circuit.

17 Claims, 7 Drawing Sheets

SOLID-STATE IMAGING DEVICE

CROSS-REFERENCE TO RELATED APPLICATIONS

This application is based upon and claims the benefit of priority from the prior Japanese Patent Application No. 2010-203635, filed on Sep. 10, 2010; the entire contents of which are incorporated herein by reference.

FIELD

Embodiments described herein relate generally to a solid-state imaging device.

BACKGROUND

In a CMOS image sensor, a two-step single-slope type ADC could be used to realize an increase in speed of a single-slope type ADC that converts an analog signal received from a pixel into a digital signal. In the two-step single-slope type ADC, an about 7.6 times increase in speed is attained. When it is attempted to attain a further increase in speed of operation of the CMOS image sensor, the increase in speed is limited by the responsiveness of a vertical signal line that transmits a signal read out from a pixel.

DETAILED DESCRIPTION

In general, according to one embodiment, a solid-state imaging device includes a pixel array unit, a vertical signal line, an acceleration circuit, an acceleration control circuit, and a timing control circuit. In the pixel array unit, pixels that accumulate photoelectrically converted charges are arranged in a matrix shape. The vertical signal line transmits a signal read out from the pixels in the vertical direction. The acceleration circuit shifts the potential of the vertical signal line in advance before a signal is read out from the pixels. The acceleration control circuit controls timing for shifting the potential of the vertical signal line in advance. The timing control circuit generates a control signal for controlling the acceleration control circuit.

Exemplary embodiments of a solid-state imaging device will be explained below in detail with reference to the accompanying drawings. The present invention is not limited to the following embodiments.

First Embodiment

Figure 1:
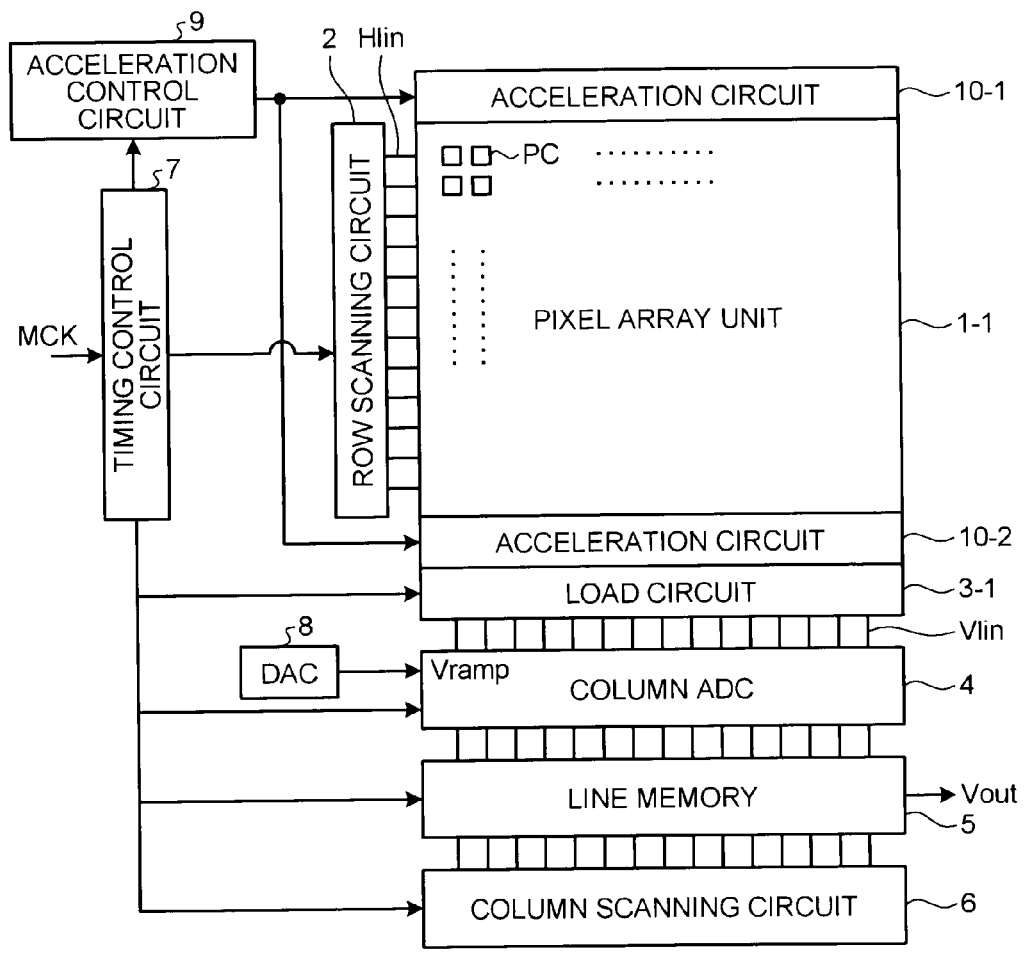
FIG. 1 is a block diagram of a schematic configuration of a solid-state imaging device according to a first embodiment.

FIG. 1 is a block diagram of a schematic configuration of a solid-state imaging device according to a first embodiment.

In FIG. 1, the solid-state imaging device includes a pixel-array unit 1-1 in which pixels PC that accumulate photoelectrically converted charges are arranged in a matrix shape in a row direction and a column direction, a row scanning circuit 2 that scans the pixels PC, from which a signal is read out, in the vertical direction, a load circuit 3-1 that makes the potential of a vertical signal line Vlin to follow the signal read out from the pixels PC, a column ADC circuit 4 that digitizes a signal component of each of the pixels PC with a CDS, a line memory 5 that stores, for one line, the signal component of each of the pixels PC digitized by the column ADC circuit 4, a column scanning circuit 6 that scans the pixels PC, from which a signal is read out, in the horizontal direction, a timing control circuit 7 that controls timing of readout of a signal from each of the pixels PC and accumulation of charges in each of the pixels PC, a DA converter 8 that outputs a ramp signal Vramp to the column ADC circuit 4, acceleration circuits 10-1 and 10-2 that shift the potential of the vertical signal line Vlin in advance before a signal is read out from the pixels PC, and an acceleration control circuit 9 that controls timing for shifting the potential of the vertical signal line Vlin in advance. A master clock MCK is input to the timing control circuit 7.

The acceleration circuits 10-1 and 10-2 are provided at both ends in the vertical direction of the pixel array unit 1-1. The acceleration circuits 10-1 and 10-2 can shift, based on an amount by which the potential of the vertical signal line Vlin is predicted to shift when a signal is read out from the pixels PC, the potential of the vertical signal line Vlin in advance before the signal is read out from the pixels PC.

The acceleration control circuit 9 can shift the potential of the vertical signal line Vlin immediately before a reset operation for the pixels PC and immediately before a readout operation for the pixels PC.

In the pixel array unit 1-1, a horizontal control line Hlin that performs readout control for the pixels PC is provided in the row direction. A vertical signal line Vlin that transmits a signal read out from the pixels PC is provided in the column direction.

When the pixels PC are scanned in the vertical direction by the row scanning circuit 2, the pixel PC in the row direction is selected. A signal read out from the pixel PC is transmitted to the column ADC circuit 4 via the vertical signal line Vlin. In the load circuit 3-1, when a signal is read out from the pixel PC, a source follower is formed between the load circuit 3-1 and the pixel PC. Therefore, the potential of the vertical signal line Vlin is made to follow the signal read out from the pixel PC.

When the signal is read out from the pixel PC, in the acceleration circuits 10-1 and 10-2, the potential of the vertical signal line Vlin is shifted in advance to a side opposite to a direction in which the potential of the vertical signal line Vlin shifts when the signal is read out from the pixel PC.

In the column ADC circuit 4, a reset level and a readout level are sampled from a signal of each of the pixels PC and a difference between the reset level and the readout level is calculated. Therefore, a signal component of each of the pixels PC is digitized by the CDS and output as an output signal Vout via the line memory 5.

The potential of the vertical signal line Vlin is shifted in advance when the signal is read out from the pixel PC. This makes it possible to reduce time in which the potential of the vertical signal line Vlin converges to the reset level or the readout level. Therefore, it is possible to improve the responsiveness of the vertical signal line Vlin that transmits the signal read out from the pixel PC and realize an increase in speed during readout by the solid-state imaging device.

Second Embodiment

Figure 2:
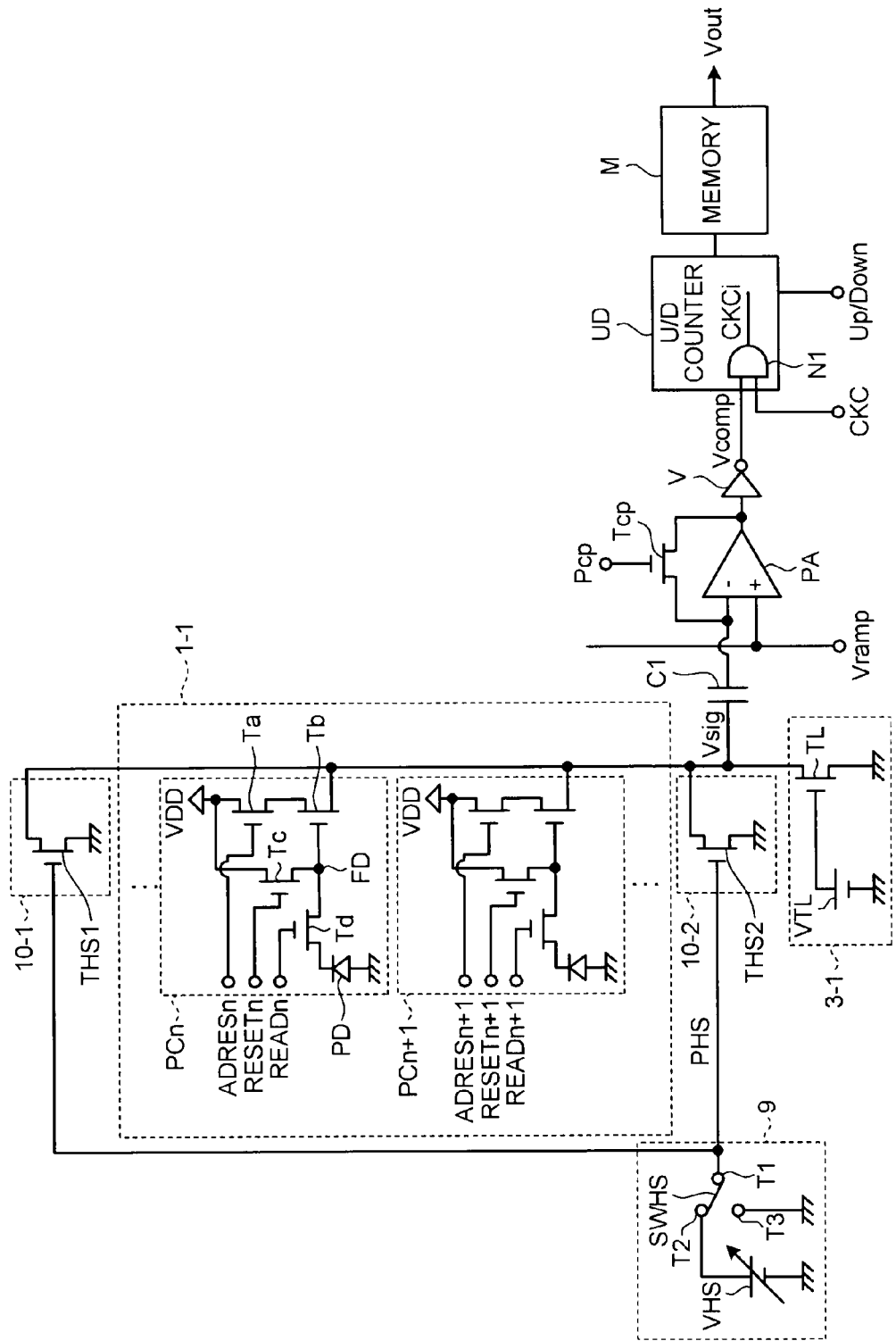
FIG. 2 is a circuit diagram of a schematic configuration for one column of a solid-state imaging device according to a second embodiment.

FIG. 2 is a circuit diagram of a schematic configuration for one column of a solid-state imaging device according to a second embodiment.

In FIG. 2, the pixel array unit 1-1 includes pixels PCn and PCn+1. The pixels PCn and PCn+1 respectively include photodiodes PD, row selection transistors Ta, amplification transistors Tb, reset transistors Tc, and readout transistors Td. Floating diffusions FD are formed as detection nodes at connection points of the amplification transistors Tb, the reset transistors Tc, and the readout transistors Td.

In the pixels PCn and PCn+1, sources of the readout transistors Td are connected to the photodiodes PD. Readout signals READn and READn+1 are respectively input to gates of the readout transistors Td. Sources of the reset transistors Tc are connected to drains of the readout transistors Td. Reset signals RESETn and RESETn+1 are respectively input to gates of the reset transistors Tc. Drains of the reset transistors Tc are connected to power supply potentials VDD. Row selection signals VDRESn and VDRESn+1 are respectively input to gates of the row selection transistors Ta. Drains of the row selection transistors Ta are connected to the power supply potentials VDD. Sources of the amplification transistors Tb are connected to the vertical signal line Vlin. Gates of the amplification transistors Tb are connected to the drains of the readout transistors Td. Drains of the amplification transistors Tb are connected to sources of the row selection transistors Ta.

The horizontal control line Hlin shown in FIG. 1 can transmit, for each row, the readout signals READn and READn+1, the reset signals RESETn and RESETn+1, and the row selection signals ADRESn and ADRESn+1 to the pixels PC.

The load circuit 3-1 includes a load transistor TL and a bias power supply VTL. A drain of the load transistor TL is connected to the vertical signal line Vlin. The bias power supply VTL is connected to a gate of the load transistor TL. The load transistor TL forms a source follower in combination with the amplification transistors Tb and can perform a constant current operation.

The column ADC circuit 4 includes, for each column, a capacitor C1, a comparator PA, a switch transistor Tcp, an inverter V, and an up-down counter UD. The up-down counter UD includes an AND circuit N1. The line memory 5 includes a memory M for each column.

The vertical signal line Vlin is connected to an inverted input terminal of the comparator PA via the capacitor C1. The ramp signal Vramp is input to a non-inverted input terminal of the comparator PA. A switch transistor Tcp is connected between the inverted input terminal and an output terminal of the comparator PA. the output terminal of the comparator PA is connected to one input terminal of the AND circuit N1 via the inverter V. A reference clock CKC is input to the other input terminal of the AND circuit N1. An output terminal of the up-down counter UD is connected to the memory M.

The acceleration circuits 10-1 and 10-2 respectively include acceleration transistors THS1 and THS2. Drains of the acceleration transistors THS1 and THS2 are connected to the vertical signal line Vlin. Sources of the acceleration transistors THS1 and THS2 are grounded.

The acceleration control circuit 9 includes a switch SWHS and a variable voltage source VHS. A terminal T1 of the switch SWHS is connected to gates of the acceleration transistors THS1 and THS2. A terminal T2 of the switch SWHS is connected to the variable voltage source VHS. A terminal T3 of the switch SWHS is grounded.

Figure 3:
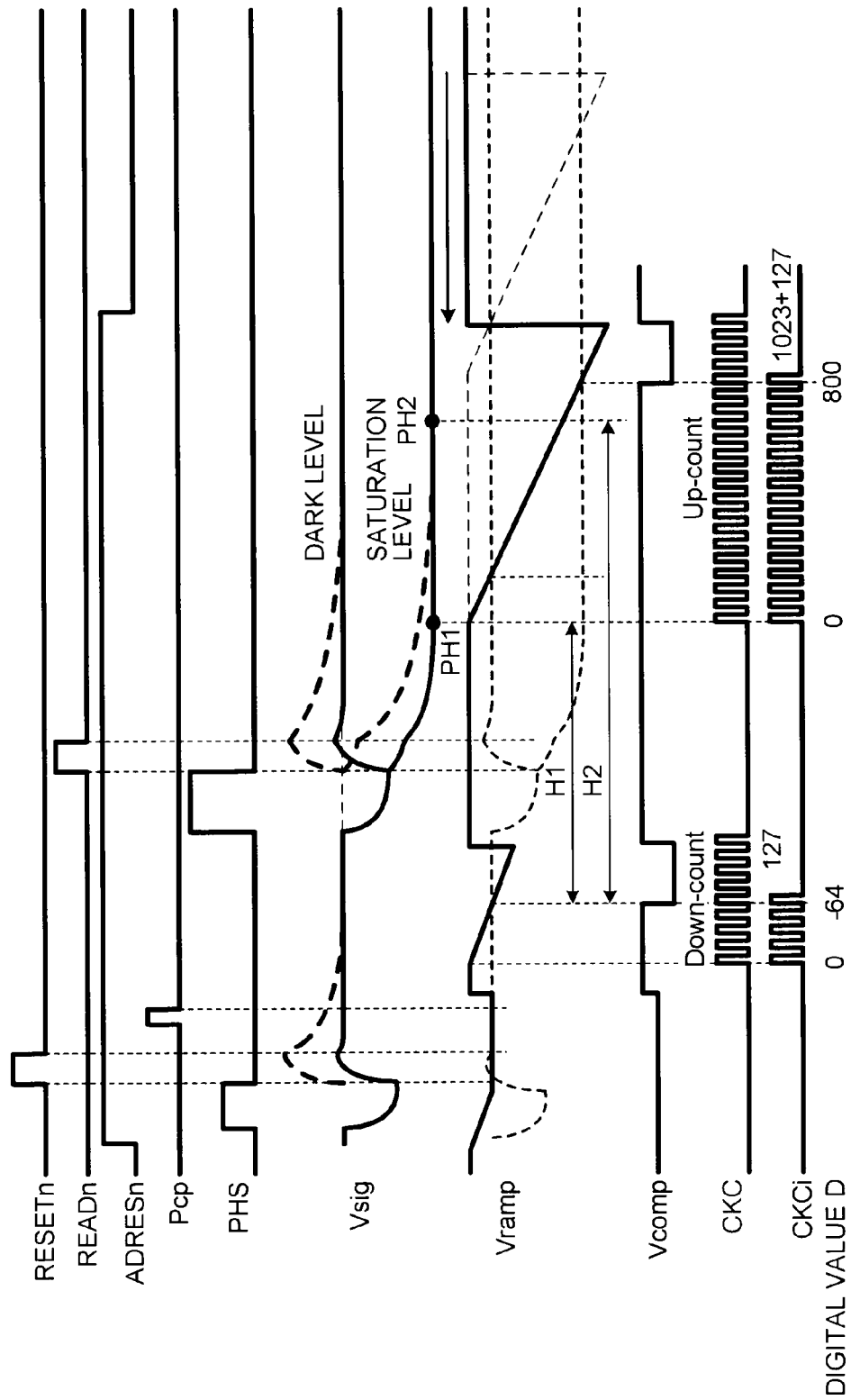
FIG. 3 is a timing chart for explaining a readout operation for one pixel of the solid-state imaging device shown in FIG. 2.

FIG. 3 is a timing chart for explaining a readout operation for one pixel of the solid-state imaging device shown in FIG. 2. A thick dotted line of the vertical signal line Vlin indicates a waveform obtained when an acceleration pulse PHS is not given. A thin dotted line of the ramp signal Vramp indicates a waveform of the vertical signal line Vlin obtained when the acceleration pulse PHS is given.

In FIG. 3, when the row selection signal ADRESn is at a low level, the row selection transistors Ta are turned off and do not perform a source follower operation. Therefore, a signal is not output to the vertical signal line Vlin. At this point, when the readout signal READn and the reset signal RESETn changes to a high level, the readout transistor Td is turned on and charges accumulated in the photodiode PD are discharged to the floating diffusion FD. The charges are discharged to the power supply VDD via the reset transistor Tc.

After the charges accumulated in the photodiode PD are discharged to the power supply VDD, when the readout signal READn changes to the low level, in the photodiode PD, accumulation of valid signal charges is started.

When the row selection signal ADRESn changes to the high level, the row selection transistor Ta of the pixel PC is turned on and the power supply potential VDD is applied to the drain of the amplification transistor Tb. Therefore, a source follower is formed by the amplification transistor Tb and the load transistor TL.

In a state in which the selection signal ADRESn is at the high level, the switch SWHS is switched from the terminal T3 to the terminal T2 before the reset signal RESETn rises. Therefore, the acceleration pulse PHS is applied to the gates of the acceleration transistors THS1 and THS2 and the acceleration transistors THS1 and THS2 are turned on.

When the acceleration transistors THS1 and THS2 are turned on, the potential of the vertical signal line Vlin is drawn to a ground level to be reduced.

In a state in which the potential of the vertical signal line Vlin is reduced, when the reset signal RESETn rises, the reset transistor Tc is turned on and excess charges generated by a leak current or the like in the floating diffusion FD are reset. A voltage corresponding to a reset level of the floating diffusion FD is applied to the gate of the amplification transistor Tb. The source follower is formed by the amplification transistor Tb and the load transistor TL. Therefore, the voltage of the vertical signal line Vlin follows the voltage applied to the gate of the amplification transistor Tb. An output voltage Vsig at the reset level is output to the vertical signal line Vlin.

While the output voltage Vsig at the reset level is output to the vertical signal line Vlin, when a reset pulse PCP is applied to a gate of the switch transistor Tcp, an input voltage of the inverted input terminal of the comparator PA is clamped by an output voltage and an operating point is set. At this point, a difference between the input voltage and the output voltage Vsig from the vertical signal line Vlin is maintained by the capacitor C1. The input voltage of the comparator PA is set to zero.

After the switch transistor Tcp is turned off, in a state in which the output voltage Vsig at the reset level is input to the comparator PA via the capacitor C1, a triangular wave is given as the ramp signal Vramp. The output voltage Vsig at the reset level and the ramp signal Vramp are compared. After being inverted by the inverter V, the output voltage of the comparator PA is input to one input terminal of the AND circuit N1 as an output voltage Vcomp.

The reference clock CKC is input to the other input terminal of the AND circuit N1. When the output voltage Vsig at the reset level is lower than the level of the ramp signal Vramp, the output voltage Vcomp changes to the high level. Therefore, the reference clock CKC passes through the AND circuit N1. A reference clock CKCi after the passage is down-counted by the up-down counter UD.

When the output voltage Vsig at the reset level coincides with the level of the ramp signal Vramp, the output voltage of the comparator PA rises and the output voltage Vcomp changes to the low level. Therefore, the reference clock CKC is blocked by the AND circuit N1 and the down-count is stopped in the up-down counter UD. Therefore, the output voltage Vsig at the reset level is converted into a digital value D and maintained in the up-down counter UD.

The switch SWHS is switched from the terminal T3 to the terminal T2 before the readout signal READn rises in a state in which the row selection transistor Ta of the pixel PCn is on. Therefore, the acceleration pulse PHS is applied to the gates of the acceleration transistors THS1 and THS2 and the acceleration transistors THS1 and THS2 are turned on.

When the acceleration transistors THS1 and THS2 are turned on, the potential of the vertical signal line Vlin is drawn to the ground level to be reduced.

In a state in which the potential of the vertical signal line Vlin is reduced, when the readout signal READn rises, the readout transistor Td is turned on, the charges accumulated in the photodiode PD are transferred to the floating diffusion FD, and a voltage corresponding to a signal level of the floating diffusion FD is applied to the gate of the amplification transistor Tb. The source follower is formed by the amplification transistor Tb and the load transistor TL. Therefore, the voltage of the vertical signal line Vlin follows the voltage applied to the gate of the amplification transistor Tb and is output to the vertical signal line Vlin as the output voltage Vsig at the readout level.

In a state in which the output voltage Vsig at the readout level is input to the comparator PA via the capacitor C1, a triangular wave is given as the ramp signal Vramp. The output voltage Vsig at the readout level and the ramp signal Vramp are compared. After being inverted by the inverter V, an output voltage of the comparator PA is input to one input terminal of the AND circuit N1 as the output voltage Vcomp.

When the output voltage Vsig at the readout level is lower than the level of the ramp signal Vramp, the output voltage Vcop changes to the high level. Therefore, the reference clock CKC passes through the AND circuit N1. The reference clock CKCi after the passage is up-counted by the up-down counter UD. When the output voltage Vsig at the readout level coincides with the level of the ramp signal Vramp, the output voltage of the comparator PA falls and the output voltage Vcomp changes to the low level. Therefore, the reference clock CKC is blocked by the AND circuit N1 and the up-count is stopped in the up-down counter UD. Therefore, a difference between the output voltage Vsig at the readout level and the output voltage Vsig at the reset level are converted into the digital value D and sent to the memory M.

As indicated by a thick dotted line of the vertical signal output Vsig, when the acceleration pulse PHS is not given, as a signal waveform of the vertical signal output Vsig, because the potential of the floating diffusion FD substantially changes when the reset signal RESETn changes to the high level, the potential of the vertical signal output Vsig also substantially changes.

After the potential of the vertical signal output Vsig also substantially changes, time equal to or longer than $5\tau=5*C*R$ is necessary as a CR time constant until the potential of the vertical signal output Vsig stabilizes. R depends on the output impedance of the source follower circuit and the wiring resistance of the vertical signal line Vlin. C depends on the wiring capacitance of the vertical signal line Vlin and diffusion capacitance that is in contact with the amplification transistor Tb.

In a 10 mega pixel CMOS sensor, when the output impedance and the wiring resistance of the vertical signal line Vlin are assumed to be 40 kilo ohm and the capacitance of the vertical signal line Vlin is 4 picofarad, time $5\tau=5*40$ k$\Omega$*4 pF=0.8 uS is necessary until the potential of the vertical signal output Vsig reaches 99.3%.

When the readout signal READn changes to the high level, the potential of the vertical signal output Vsig also substantially changes because of a change due to coupling capacitance of the readout transistor Td and the floating diffusion FD and a change due to a signal amount read out from the photodiode PD. In this case, time equal to or longer than 0.8 microsecond of $5\tau$ is necessary.

On the other hand, the potential of the vertical signal output Vsig can be shifted in advance by a change in the potential of the vertical signal output Vsig during the rise of the reset signal RESETn by applying the acceleration pulse PHS immediately before the reset signal RESETn rises. As a result, the potential of the vertical signal output Vsig immediately after a reset operation can be set in a substantially stable level. The responsiveness of the vertical signal output Vsig can be simulatively accelerated. As this responsiveness, the time was able to be reduced to about a quarter time; 0.2 microsecond.

Similarly, by applying the acceleration pulse PHS immediately before the readout signal READn rises, the potential of the vertical signal output Vsig can be shifted in advance such that the readout signal READn is at an intermediate level of a dark signal level of the vertical signal output Vsig during the rise of the readout signal READn and a saturated signal level. As a result, a charge amount for charging the capacitance of the vertical signal line Vlin can be reduced to about a half. Response time of the vertical signal output Vsig can be reduced to about a half time; 0.4 microsecond.

When the acceleration pulse PHS is not given, at both the dark signal level and a saturation signal level, the potential of the vertical signal output Vsig changes in the rising direction. However, by giving the acceleration pulse PHS, the potential of the vertical signal line Vlin can be changed in both the rising direction and the falling direction. The response time of the vertical signal output Vsig can be reduced to about a half.

The abilities of the rising and the falling of the potential of the vertical signal output Vsig depend on driving forces of the load transistor TL and the amplification transistor Tb. Therefore, the amplitude of the acceleration pulse PHS can be set according to the driving forces of the load transistor TL and the amplification transistor Tb.

In the example shown in FIG. 1, the method of providing the acceleration circuits 10-1 and 10-2 at both the ends in the vertical direction of the pixel array unit 1-1 is explained. However, an acceleration circuit can be provided at only one end in the vertical direction of the pixel array unit 1-1. In this case, a decrease in the driving forces can be supplemented by increasing the pulse width of the acceleration pulse PHS.

In a dark environment, an analog gain could be increased by reducing the amplitude of the triangular wave of the ramp signal Vramp. In this case, a saturated signal amount of the valid photodiode PD decreases to, for example, a quarter or a one-eighth. The responsiveness of the vertical signal output Vsig can be further accelerated by changing the amplitude of the acceleration pulse PHS according to the saturated signal level.

CDS time can be reduced from PH2 to PH1 and 1/f (RTS) noise can be reduced by bringing forward an operation start point of the column ADC circuit 4 during a readout operation according to the improvement of the responsiveness of the vertical signal output Vsig. H1 is CDS time required when the acceleration pulse PHS is given. H2 is CDS time required when the acceleration pulse PHS is not given.

When the wiring resistance of the vertical signal line Vlin is large, a large improvement effect can be obtained by arranging acceleration circuits in upper and lower parts of the vertical signal line. In a product including multiple refined pixels, the wiring resistance is high because the wiring width of the vertical signal line Vlin is small. Therefore, the improvement effect of this embodiment is large.

Third Embodiment

Figure 4:
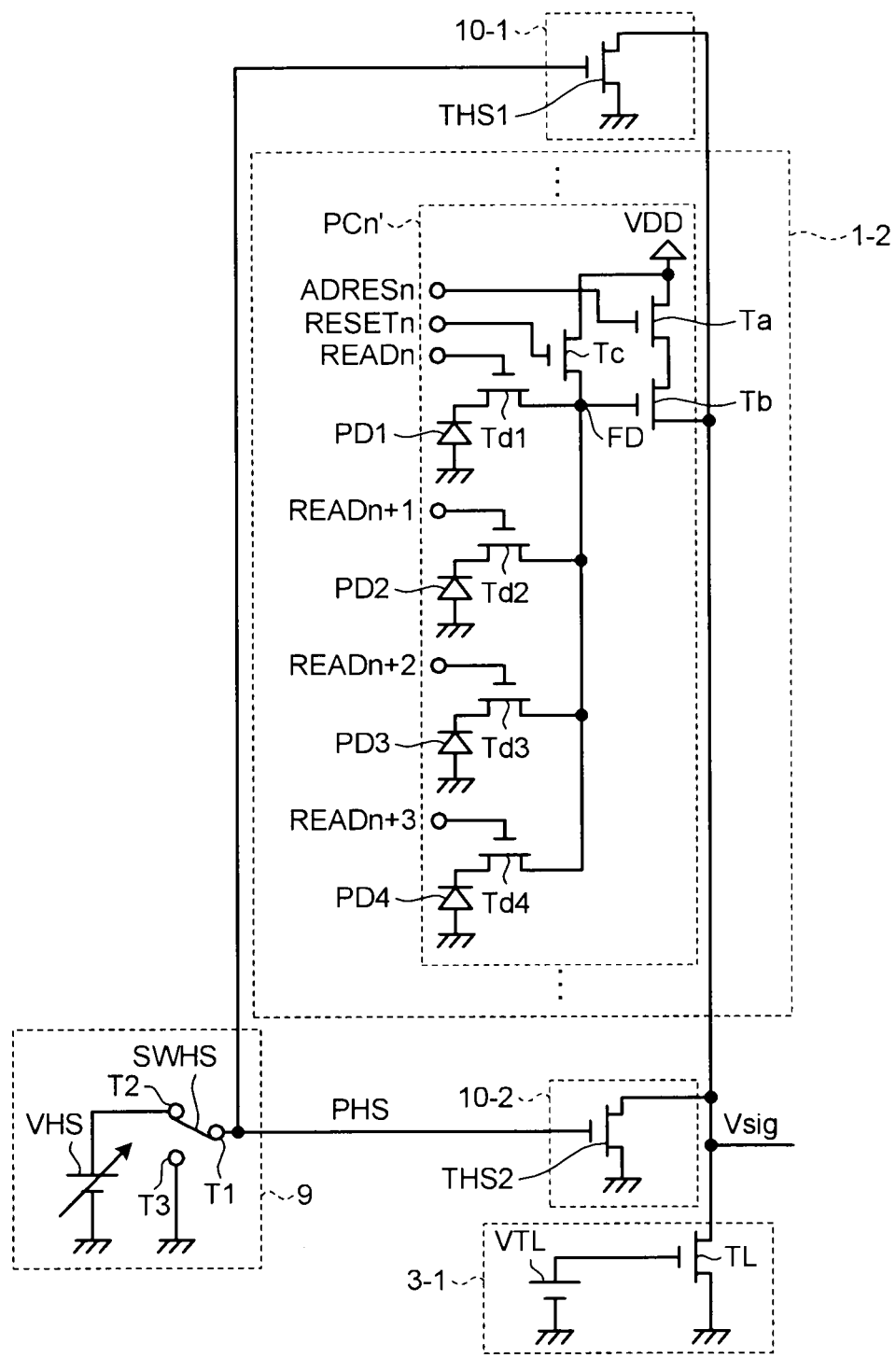
FIG. 4 is a circuit diagram of a schematic configuration for one column of a solid-state imaging device according to a third embodiment.

FIG. 4 is a circuit diagram of a schematic configuration for one column of a solid-state imaging device according to a third embodiment.

In FIG. 4, the solid-state imaging device includes a pixel array unit 1-2 instead of the pixel array unit 1-1 shown in FIG. 2. The pixel array unit 1-2 includes a pixel PCn' instead of the pixel PCn.

The pixel PCn' includes readout transistors Td1 to Td4 instead of the readout transistors Td and includes photodiodes PD1 to PD4 instead of the photodiodes PD.

The photodiodes PD1 to PD4 are respectively connected to the readout transistors Td1 to Td4. One amplification transistor Tb is shared by the photodiodes PD1 to PD4 for four pixels.

Because a plurality of pixels are made to share the amplification transistor Tb, it is possible to reduce the number of amplification transistors Tb connected to the vertical signal line Vlin and improve the responsiveness of the vertical signal line Vlin.

In the example shown in FIG. 4, the method of causing four pixels to share the one amplification transistor Tb is explained. However, an arbitrary number of pixels can be made to share the one amplification transistor Tb.

Fourth Embodiment

Figure 5:
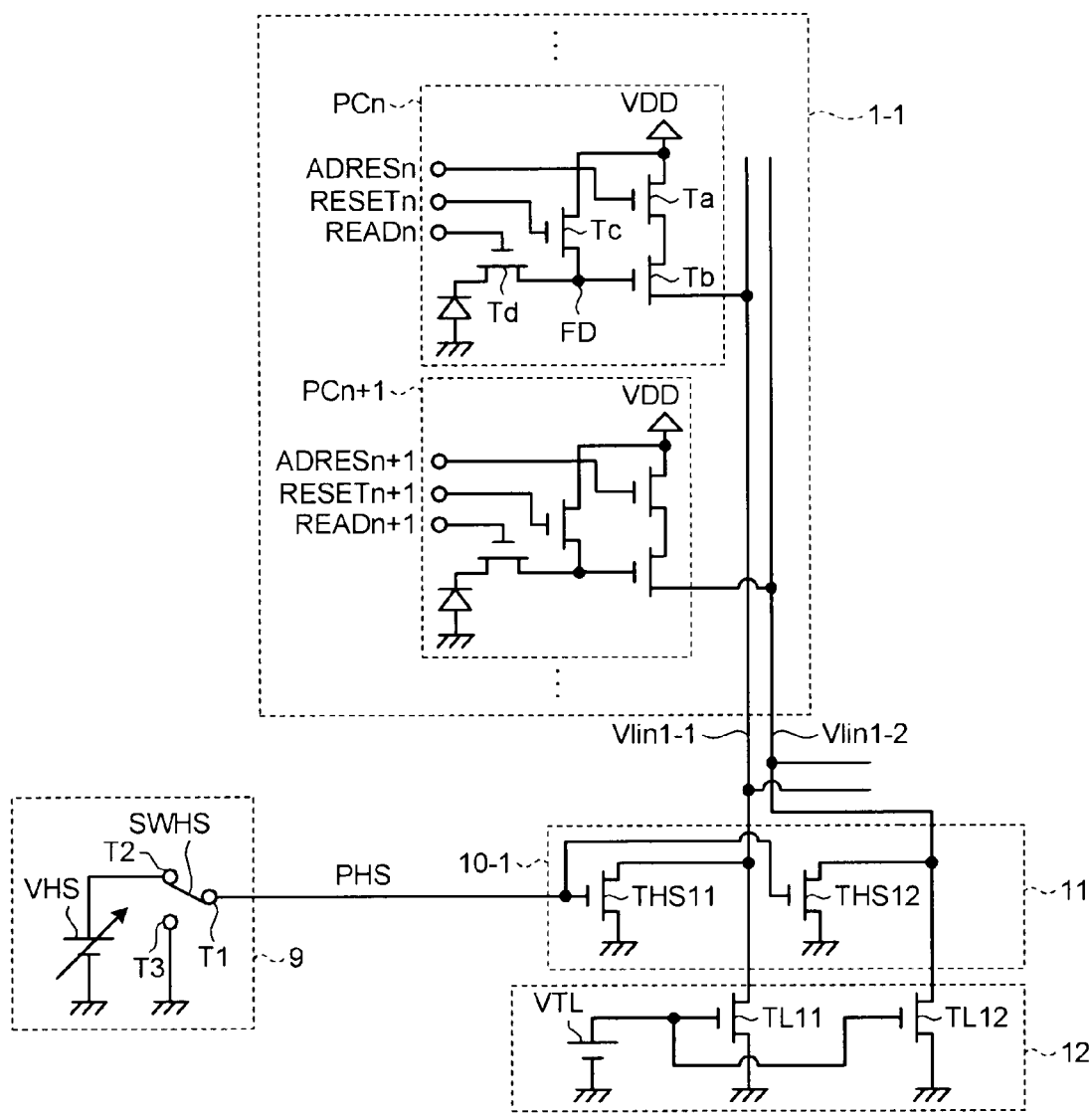
FIG. 5 is a circuit diagram of a schematic configuration for one column of a solid-state imaging device according to a fourth embodiment.

FIG. 5 is a circuit diagram of a schematic configuration for one column of a solid-state imaging device according to a fourth embodiment.

In FIG. 5, the solid-state imaging device includes two vertical signal lines Vlin1-1 and Vlin1-2 for each column. The vertical signal line Vlin1-1 is connected to the pixel PCn and the vertical signal line Vlin1-2 is connected to the pixel PCn+1.

The solid-state imaging device includes a load circuit 12 instead of the load circuit 3-1 shown in FIG. 2 and includes an acceleration circuit 11 instead of the acceleration circuits 10-1 and 10-2.

The load circuit 12 includes load transistors TL11 and TL12 and a bias power supply VTL. A drain of the load transistor TL11 is connected to the vertical signal line Vlin1-1. The bias power supply VTL is connected to a gate of the load transistor TL11. The drain of the load transistor TL11 is connected to the vertical signal line Vlin1-2. The bias power supply VTL is connected to a gate of the load transistor TL12.

The acceleration circuit 11 includes acceleration transistors THS11 and THS12. A drain of the acceleration transistor THS11 is connected to the vertical signal line Vlin1-1. A drain of the acceleration transistor THS12 is connected to the vertical signal line Vlin1-2. Sources of the acceleration transistors THS11 and THS12 are grounded. Gates of the acceleration transistors THS11 and THS12 are connected to the terminal T1 of the switch SWHS.

When the pixel PCn is selected, the switch SWHS is switched from the terminal T3 to the terminal T2 immediately before a reset operation for the pixel PCn and immediately before a readout operation for the pixel PCn. At this point, the acceleration pulse PHS is applied to the gate of the acceleration transistor THS11 and the acceleration transistor THS11 is turned on. Therefore, the potential of the vertical signal line Vlin1 is reduced before the reset signal RESETn or the readout signal READn rises.

When the pixel PCn+1 is selected, the switch SWHS is switched from the terminal T3 to the terminal T2 immediately before a reset operation for the pixel PCn+1 and immediately before a readout operation for the pixel PCn+1. At this point, the acceleration pulse PHS is applied to the gate of the acceleration transistor THS12 and the acceleration transistor THS12 is turned on. Therefore, the potential of the vertical signal line Vlin2 is reduced before the reset signal RESETn+1 or the readout signal READn+1 rises.

The vertical signal lines Vlin1 and Vlin2 are provided for each column. Therefore, it is possible to reduce the number of amplification transistors Tb connected to one vertical signal line Vlin1 or Vlin2. It is possible to improve the responsiveness of the vertical signal lines Vlin1 and Vlin2.

In the example shown in FIG. 5, the method of providing the two vertical signal lines Vlin1 and Vlin2 for each column is explained. However, an arbitrary number of vertical signal lines can be provided for each column. Further, it is possible to further improve the responsiveness by providing the acceleration circuit 11 in an upper part of the vertical signal lines in the same manner as shown in FIGS. 2 and 4.

Fifth Embodiment

Figure 6:
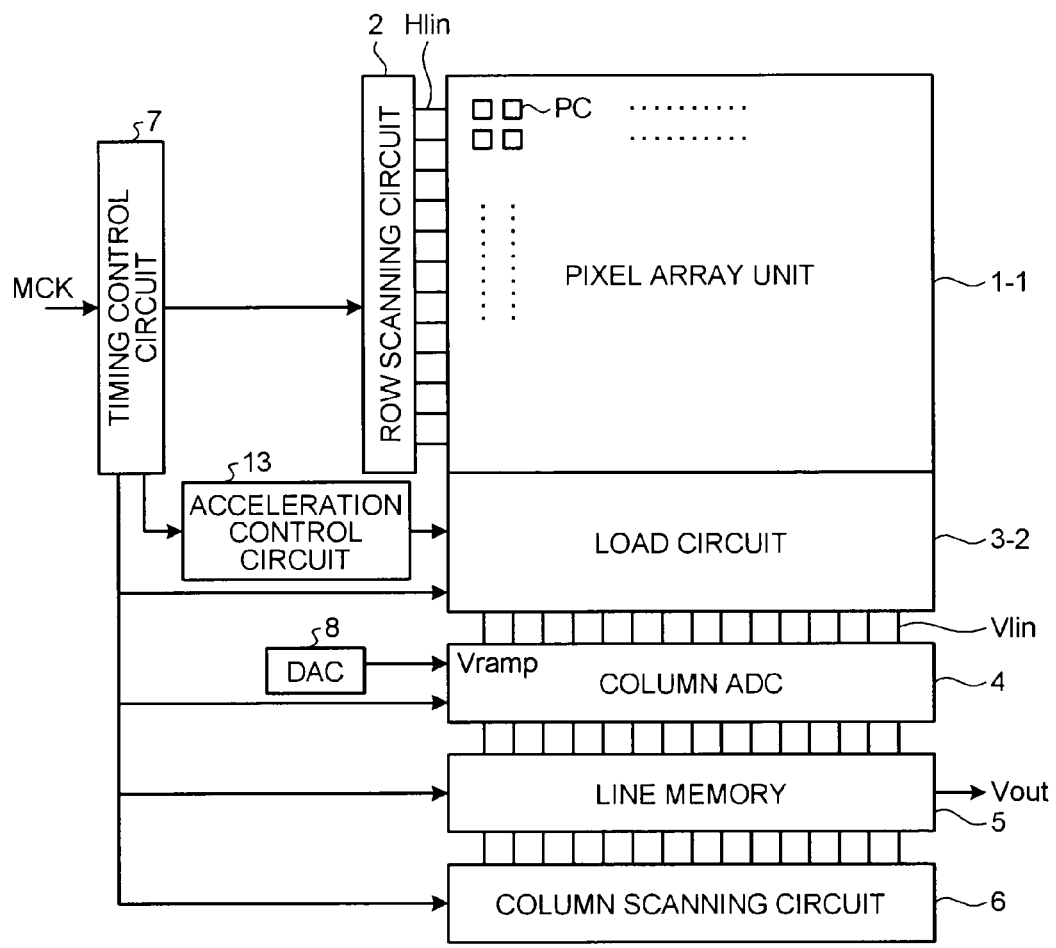
FIG. 6 is a block diagram of a schematic configuration of a solid-state imaging device according to a fifth embodiment.

FIG. 6 is a block diagram of a schematic configuration of a solid-state imaging device according to a fifth embodiment.

In FIG. 6, the solid-state imaging device includes a load circuit 3-2 instead of the load circuit 3-1 and the acceleration circuits 10-1 and 10-2 of the solid-state imaging device shown in FIG. 1. The solid-state imaging device includes an acceleration control circuit 13 instead of the acceleration control circuit 9 of the solid-state imaging device shown in FIG. 1.

The load circuit 3-2 can shift the potential of the vertical signal line Vlin in advance before a signal is read out from the pixels PC and make, when a signal is read out from the pixels PC, the potential of the vertical signal line Vlin to follow the signal read out from the pixels PC.

The acceleration control circuit 13 can shift the potential of the vertical signal line Vlin in advance immediately before a reset operation for the pixels PC and a readout operation for the pixels PC.

The row scanning circuit 2 scans the pixels PC in the vertical direction. Therefore, the pixel PC in the row direction is selected and a signal read out from the pixel PC is transmitted to the column ADC circuit 4 via the vertical signal line Vlin.

In the load circuit 3-2, when the signal is read out from the pixel PC, the potential of the vertical signal line Vlin is shifted in advance to a side opposite to a direction in which the potential of the vertical signal line Vlin shifts when the signal is read out from the pixel PC. A source follower is formed between the load circuit 3-2 and the pixel PC when the signal is read out from the pixel PC. Therefore, the potential of the vertical signal Vlin is made to follow the signal read out from the pixel PC.

In the column ADC circuit 4, a reset level and a readout level are sampled from a signal of each of the pixels PC and a difference between the reset level and the readout level is calculated. Therefore, a signal component of each of the pixels PC is digitized by the CDS and output as the output signal Vout via the line memory 5.

The potential of the vertical signal line Vlin is shifted in advance when the signal is read out from the pixel PC. This makes it possible to reduce time in which the potential of the vertical signal line Vlin converges to the reset level or the readout level. Therefore, it is possible to improve the responsiveness of the vertical signal line Vlin that transmits the signal read out from the pixel PC and realize an increase in speed during readout by the solid-state imaging device.

Sixth Embodiment

Figure 7:
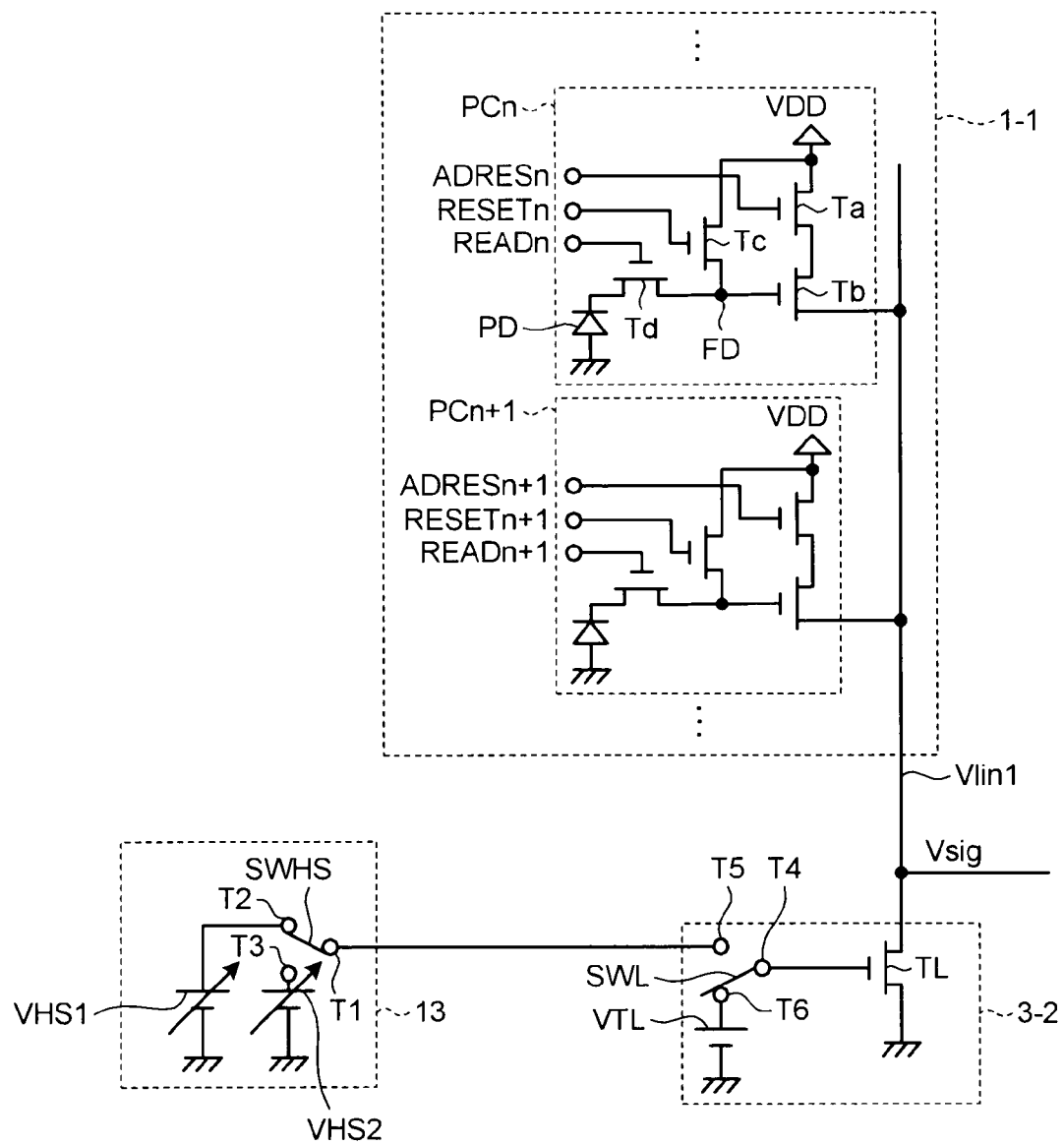
FIG. 7 is a circuit diagram of a schematic configuration for one column of a solid-state imaging device according to a sixth embodiment.

FIG. 7 is a circuit diagram of a schematic configuration for one column of a solid-state imaging device according to a sixth embodiment.

In FIG. 7, the load circuit 3-2 includes the load transistor TL, the bias power supply VTL, and a switch SWL. The drain of the load transistor TL is connected to the vertical signal line Vlin. A terminal T4 of the switch SWL is connected to the gate of the load transistor TL. The bias power supply VTL is connected to a terminal T6 of the switch SWL. A source follower is formed by the amplification transistor Tb and the load transistor TL. The voltage of the vertical signal line Vlin follows the voltage applied to the gate of the amplification transistor Tb. Therefore, the output voltage Vsig is output to the vertical signal line Vlin.

The acceleration control circuit 13 includes the switch SWHS and variable voltage sources VHS1 and VHS2. The terminal T1 of the switch SWHS is connected to the terminal T5 of the switch SWL, the terminal T2 of the switch SWHS is connected to the variable voltage source VHS1, and the terminal T3 of the switch SWHS is connected to the variable voltage source VHS2.

During a reset operation, the switch SWL is switched from the terminal T6 to the terminal T5 and the switch SWHS is switched to the terminal T2 immediately before the reset signal RESETn rises. At this point, acceleration pulse is applied to the gate of the load transistor TL and a constant current amount of the load transistor TL is increased. Therefore, the potential of the vertical signal line Vlin is reduced before the reset signal RESETn rises.

In a state in which the potential of the vertical signal line Vlin is reduced, the switch SWL is switched from the terminal T5 to the terminal T6. Therefore, the bias power supply VTL is connected to the gate of the load transistor TL. The reduced potential of the vertical signal line Vlin is increased in a direction of stable potential when the reset signal RESETn rises. When the reset signal RESETn falls, the potential of the vertical signal line Vlin changes to stable potential. In an experiment, an effect of about four times improvement was obtained.

On the other hand, during the switch SWL is switched from the terminal T6 to the terminal T5 and the switch SWHS is switched to the terminal T3 immediately before the readout signal READn rises. At this point, an acceleration pulse is applied to the gate of the load transistor TL and a constant current amount of the load transistor TL is increased. Therefore, the potential of the vertical signal line Vlin is reduced before the readout signal READn rises.

In a state in which the potential of the vertical signal line Vlin is reduced, the switch SWL is switched from the terminal T5 to the terminal T6. Therefore, the bias power supply VTL is connected to the gate of the load transistor TL. The reduced potential of the vertical signal line Vlin is increased in a direction of stable potential when the readout signal READn rises. When the readout signal READn falls, the potential of the vertical signal line Vlin changes to stable potential. Stable potential of converging potential of the potential of the vertical signal line Vlin during signal readout is the potential of the vertical signal line Vlin substantially in the middle between potential during a dark time of a signal and potential during saturation of the photodiode PD. In an experiment, an effect of about two times improvement was obtained.

In this embodiment, the potential of a vertical signal line is shifted by increasing an electric current of the vertical signal line immediately before the reset operation and the readout operation. The current increased is stopped and GND fluctuation due to a current change of the vertical signal line is stabilized in a period of the reset or readout operation. Therefore, it is possible to prevent an increase in noise. Further, the voltage or the pulse width of a pulse for an acceleration operation is separately set for the reset operation and the readout operation. Consequently, it is possible to set the voltage or the pulse width optimum for the reset operation and the readout operation. Therefore, it is possible to realize a substantial increase in operation speed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
    a pixel array unit in which pixels that accumulate photo-electrically converted charges are arranged in a matrix shape;
    a vertical signal line that transmits a signal read out from the pixels in a vertical direction;
    an acceleration circuit that shifts potential of the vertical signal line in advance before a signal is read out from the pixels;
    an acceleration control circuit that controls timing for shifting the potential of the vertical signal line in advance; and
    a timing control circuit that generates a control signal for controlling the acceleration control circuit, wherein
    the acceleration circuit includes an acceleration transistor that shifts the potential of the vertical signal line, the acceleration control circuit includes a switch that turns on and off the acceleration transistor, and the acceleration control circuit includes a variable voltage source that changes a voltage applied when the acceleration transistor is turned on.

2. The solid-state imaging device according to claim 1, wherein the acceleration circuit shifts, based on an amount by which the potential of the vertical signal line is predicted to shift when the signal is read out from the pixels, the potential of the vertical signal line in advance before the signal is read out from the pixels.

3. The solid-state imaging device according to claim 1, wherein the variable voltage source changes, according to a level of a signal amount read out from the pixels, the voltage applied when the acceleration transistor is turned on.

4. The solid-state imaging device according to claim 1, wherein a pair of the acceleration circuits are provided at both ends in the vertical direction of the pixel array unit.

5. The solid-state imaging device according to claim 1, wherein the acceleration circuit is provided at one end in the vertical direction of the pixel array unit.

6. The solid-state imaging device according to claim 1, wherein the acceleration circuit shifts the potential of the vertical signal line in advance immediately before a reset operation for the pixels and immediately before a readout operation for the pixels.

7. The solid-state imaging device according to claim 1, wherein the acceleration circuit shifts the potential of the vertical signal line in advance to a side opposite to a direction in which the potential of the vertical signal line shifts when a signal is read out from the pixels.

8. The solid-state imaging device according to claim 1, wherein each of the pixels includes:
a photodiode that performs photoelectric conversion;
a readout transistor that transfers, based on a readout signal, a signal from the photodiode to a floating diffusion;
a reset transistor that resets, based on a reset signal, a signal accumulated in the floating diffusion; and
an amplification transistor that detects potential of the floating diffusion.

9. The solid-state imaging device according to claim 8, further comprising a load transistor that forms a source follower between the load transistor and the amplification transistor.

10. The solid-state imaging device according to claim 8, wherein the acceleration circuit shifts the potential of the vertical signal line in advance by a change in the potential of the vertical signal line that changes when the reset signal rises.

11. The solid-state imaging device according to claim 8, wherein the acceleration circuit shifts the potential of the vertical signal line in advance to be an intermediate level between a dark signal level of the vertical signal line obtained when the readout signal rises and a saturated signal level.

12. A solid-state imaging device comprising:
a pixel array unit in which pixels that accumulate photoelectrically converted charges are arranged in a matrix shape;
a vertical signal line that transmits a signal read out from the pixels in a vertical direction;
a load circuit that can control potential of the vertical signal line;
an acceleration control circuit for controlling the load circuit; and
a timing control circuit that generates a control signal for controlling the acceleration control circuit, wherein
the load circuit includes:
a load transistor connected to the vertical signal line;
a bias power supply that supplies a bias voltage to a gate of the load transistor; and
a switch that switches a voltage applied to the gate of the load transistor; and
the acceleration control circuit includes a variable voltage source.

13. The solid-state imaging device according to claim 12, wherein
the solid-state imaging device shifts the potential of the vertical signal line in advance by connecting the variable voltage source to the gate of the load transistor via the switch immediately before a reset operation for the pixels, and
the solid-state imaging device connects the bias power supply to the gate of the load transistor via the switch during the reset operation.

14. The solid-state imaging device according to claim 12, wherein
the solid-state imaging device shifts the potential of the vertical signal line in advance by connecting the variable voltage source to the gate of the load transistor via the switch immediately before a readout operation for the pixels, and
the solid-state imaging device connects the bias power supply to the gate of the load transistor via the switch during the readout operation.

15. The solid-state imaging device according to claim 12, wherein a source follower is formed between the load transistor and the pixels when a signal is read out from the pixels.

16. A solid-state imaging device comprising:
a pixel array unit in which pixels that accumulate photoelectrically converted charges are arranged in a matrix shape;
a vertical signal line that transmits a signal read out from the pixels in a vertical direction;
a load circuit that can control potential of the vertical signal line;
an acceleration control circuit for controlling the load circuit; and
a timing control circuit that generates a control signal for controlling the acceleration control circuit,
wherein the load circuit shifts the potential of the vertical signal line in advance before a signal is read out from the pixels and makes, when the signal is read out from the pixels, the potential of the vertical signal line to follow the signal read out from the pixels.

17. The solid-state imaging device according to claim 16, wherein the load circuit shifts, when the signal is read out from the pixels, the potential of the vertical signal line in advance to a side opposite to a direction in which the potential of the vertical signal line shifts when the signal is read out from the pixels.

* * * * *